United States Patent [19]
Watanabe et al.

[11] 4,128,673
[45] Dec. 5, 1978

[54] METHOD FOR SUPER CALENDERING MAGNETIC RECORDING ELEMENTS

[75] Inventors: Kenzi Watanabe; Masaaki Fujiyama, both of Odawara, Japan

[73] Assignee: Fuji Photo Film Co., Ltd., Minami-ashigara, Japan

[21] Appl. No.: 818,706

[22] Filed: Jul. 25, 1977

Related U.S. Application Data

[63] Continuation of Ser. No. 657,800, Feb. 13, 1976, abandoned.

[30] Foreign Application Priority Data

Feb. 13, 1975 [JP] Japan ................................ 50-18213
Mar. 7, 1975 [JP] Japan ................................ 50-27783

[51] Int. Cl.² ........................................... H01F 10/02
[52] U.S. Cl. .................................... 427/130; 427/128
[58] Field of Search ............................. 427/127–132, 427/48

[56] References Cited
U.S. PATENT DOCUMENTS

| 2,688,567 | 9/1954 | Franck | 427/130 |
| 3,216,846 | 11/1965 | Hendricx et al. | 427/130 |
| 3,398,011 | 8/1968 | Neirotti et al. | 427/130 X |
| 3,473,960 | 10/1969 | Jacobson et al. | 427/130 |

Primary Examiner—Bernard D. Pianalto

Attorney, Agent, or Firm—Sughrue, Rothwell, Mion, Zinn and Macpeak

[57] ABSTRACT

In a method for super calendering a magnetic recording element comprising a non-magnetic flexible support having provided thereon a magnetic layer mainly composed of ferromagnetic powders and a binder using a super calendering roll assembly having a metal roll in contact with the magnetic layer side and an elastic roll in contact with the support side opposite the metal roll, which comprises pressing the surface of the magnetic layer to thereby super calender the same, at least the surface area of the elastic roll comprises a polyamide resin having a Shore hardness D of at least about 70 and having a linear expansion coefficient of at least about $8 \times 10^{-5}/°C$.

An improved super calendering roll assembly for magnetic tape which comprises a metal roll axis having provided therearound an elastic roll and further having provided endplates around the metal roll axis at two positions which are longer than the length of the elastic roll in the direction of the axis thereof and are at a length corresponding to the thermal expansion point of the elastic roll, at least the surface area of the elastic roll thus provided comprising a polyamide resin as defined above.

Magnetic tapes having excellent surface properties can thus be obtained, which are suitable for use as video tapes, memory tapes and audio tapes requiring decreased chromanoise and high sensitivity.

7 Claims, 13 Drawing Figures

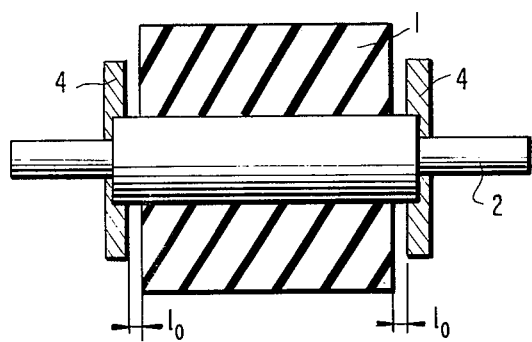
FIG. 9
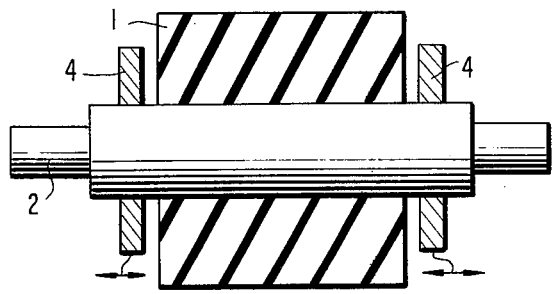
FIG. 10
FIG. 11
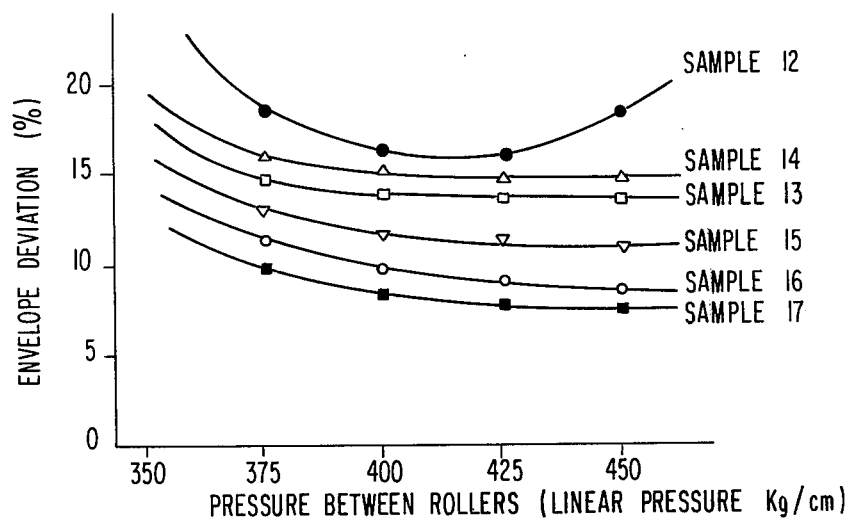
FIG. 12
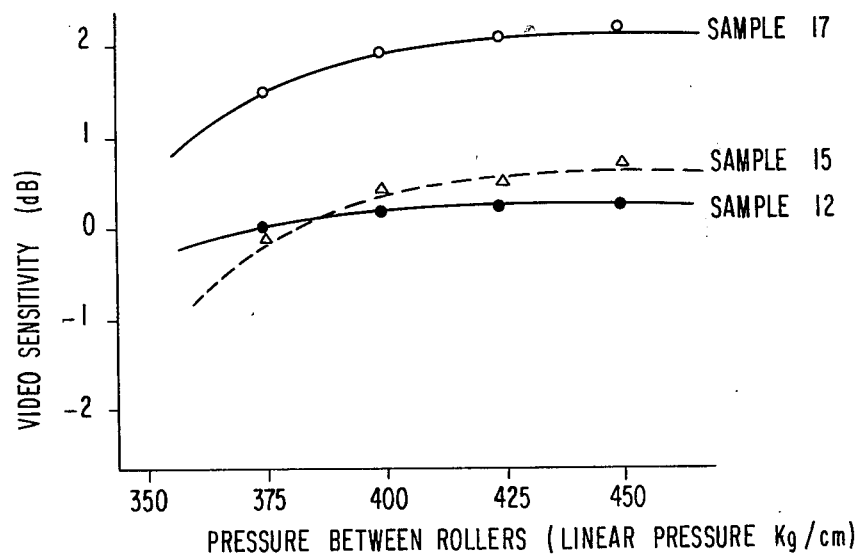

METHOD FOR SUPER CALENDERING MAGNETIC RECORDING ELEMENTS

This is a continuation, of application Ser. No. 657,800, filed Feb. 13, 1976 and now abandoned.

BACKGROUND OF THE INVENTION

1. Field of the Invention

The present invention relates to a method for super calendering the surface of magnetic recording elements such as video tapes, memory tapes, audio tapes and the like, and to a super calendering roll assembly for the same.

2. Description of the Prior Art

The methods described below are known for super calendering the surface of magnetic layers of magnetic recording elements:

(1) A method which comprises improving either the properties of dispersing agents or dispersing means in the preparation of a magnetic coating liquid to form magnetic layers of less roughness on the surface thereof immediately after coating, i.e., since the surface is soft immediately after coating, while it is soft the surface is smoothened with a smoothing roll;

(2) A method which comprises, after coating and drying, abrasion-polishing the magnetic layer by moving the magnetic layer against a similar magnetic layer at a high relative rate, thereby super calendering the surfaces of the magnetic layers;

(3) A method which comprises abrading the magnetic layers by means of animal hair or a plastic or metallic brush to polish the same; and (4) A method for forming the magnetic layers by means of a press roll called a super calender.

The four methods mentioned above, however, have the disadvantages indicated below:

In method (1), the electromagnetic conversion characteristics, mainly sensitivity and the S/N ratio, are not satisfactory.

In method (2), drop out increases due to scrapped powders generated from the magnetic layers during polishing; the method is not useful in a practical sense.

In method (3), the surface calendering required for high density recording is impossible.

In method (4), rolls made of crude cotton, absorbent cotton, asbestoes, pulp, cotton, wood and the like, such as cotton rolls, Filmat (compressed absorbent cotton) rolls, asbesto rolls and wood paper based rolls have been employed as elastic rolls. However, a sufficient super calendering effect is not obtained in these elastic rolls, i.e., there is too much noise (chromanoise) when color signals are recorded.

The disadvantages above are believed to be due to an insufficient super calendering effect on the magnetic layers and are caused by substantial unevenness (roughness) of the surfaces of the magnetic layers.

The present invention is concerned with an improvement of the surface properties of magnetic recording layers using a specific super calendering roll assembly to thereby decrease the chromanoise in video signals and the S/N ratio in audio signals.

The characteristics described above are improved by a decrease in envelope deviation. This will be better understood by referring to the drawings.

In the wave shape of a video output, as is shown in FIG. 1 (the ideal wave shape of the output), it is desired that the maximum level of the output reproduced be constant at all times, if the output level upon recording is constant. However, the output actually varies because of uneven contact of a magnetic head with a magnetic tape and other reasons, as is shown in FIG. 2 (the actual wave shape of the output).

While there is no art recognized technique to determine deviations in the output level, the ratio of the deviation of the output from the maximum output level is designated the envelope deviation in the present invention in order to quantitatively evaluate the deviation.

In the present invention, the evaluation of the envelope deviation is made in accordance with the following equation:

$$Vo/Vs \times 100 = \text{Envelope Deviation (\%)} \tag{1}$$

wherein Vs: the ½ width of the maximum output of a carrier signal; and

Vo: the output deviation width of the carrier signal.

By this evaluation, the envelope deviation with conventional tapes is above 15%, while the envelope deviation is preferred to be below 13% for practical use. In the present invention, the envelope deviation is less than 10% at its worst.

As is shown in FIG. 3, the principle of super calendering is to press magnetic recording elements with a high linear pressure between metal rolls of excellent surface smoothness ($M_1$, $M_2$ and $M_3$) and elastic rolls ($E_1$ and $E_2$). Super calendering of the surfaces of magnetic recording elements is due to the pressure between these rolls. In FIG. 3, A designates a guide roll and B designates a winding roll. The number of metal rolls ($M_1$, $M_2$, $M_3$, $M_4$,) and elastic rolls ($E_1$, $E_2$, $E_3$,) may optionally be increased or decreased.

According to conventional methods for preparing such elastic rolls, there are known a method of merely casting a roll part having inserted therein a core and a method for mechanically molding resin into a pipe shape with the subsequent mechanical insertion thereof around a core or the subsequent insertion thereof around a core under heating.

The super calendering rolls prepared in these manners have a shape as is shown in FIG. 4 (a). These rolls are, however, disadvantageous at the following points:

(a) Due to the large nip pressure on super calendering, the load which is placed on the roll is large so that the roll cannot tolerate the pressure which causes a noise called skewing.

(b) Due to autogenously generated roll heat in super calendering, the center of the roll is expanded by thermal expansion to a drum shape as is shown in FIG. 4 (b), and, as a result, the pressure on the roll becomes uneven, which results in uneven thicknesses of the magnetic tape prepared.

(c) If the thickness of the roll is increased, the thermal expansion becomes larger; if it is decreased, cracking or peeling-off occurs.

(d) Due to uneven temperature distribution in the roll, uneven hardness results in the roll, and, as a result, the pressure becomes non-uniform to cause uneven thicknesses in the magnetic tape produced.

In FIG. 4, numeral 1 designates an elastic part, numeral 2 designates a metal core of a roll and numeral 3 designates thermally expanded areas.

In order to eliminate the disadvantages described above, the materials of elastic rolls must meet the following criteria:

(1) high hardness and must not be destroyed even under high linear pressures;
(2) excellent abrasion resistance;
(3) low electrical charging and must not absorb dust;
(4) excellent surface properties; and
(5) hardly undergoes changes in shape or soften at high temperatures.

The following conditions are required in an elastic roll to obtain further improved super calendering effects, particularly operation for long periods of times.

(6) the roll must have a structure from which thermal expansion due to autogenous heat of the elastic part of the roll is removed to thereby prevent distortion of the roll in shape which results in non-uniform pressure thereon;
(7) to prevent the noise called skewing, the roll should be designed so as to not peel off and, at the same time, to avoid breakage due to cracking;
(8) distortion of the shape of the roll, local increases in temperature and uneven hardness of the roll should be prevented; and
(9) durability should be improved.

Elastic rolls comprising urethane rubbers which are improved over conventional fiber rolls are known elastic rolls having the above characteristics (see Japanese Patent Application (OPI) 104611/74). However, these rolls still have insufficient mechanical strength and are practically disadvantageous.

In order to specifically meet requirements (6) to (9) above, an elastic roll is preferred to have a structure as is shown in FIGS. 5 to 10.

SUMMARY OF THE INVENTION

As the result of a study of these points, one object of the present invention is to provide a method for super calendering magnetic recording elements using an elastic roll having a Shore hardness D of at least about 70 and having a linear expansion coefficient of at least about $8 \times 10^{-5}/°$ C. which simultaneously exhibits good compressive strength.

The present invention also has as an object to provide a method for super calendering a magnetic recording element comprising a non-magnetic flexible support having provided thereon a magnetic layer mainly composed of ferromagnetic powders and a binder using a super calendering roll assembly having a metal roll in contact with the magnetic layer side and an elastic roll on the support side opposite the metal roll, which comprises pressing the surface of the magnetic layer to thereby super calender the same, at least the surface of the elastic roll comprising a polyamide resin having a Shore hardness D of at least about 70, preferably 70 or greater, and a linear expansion coefficient of at least about $8 \times 10^{-5}/°$ C., preferably $8 \times 10^{-5}/°$ C. or greater.

The present invention further has as an object to provide a super calendering roll assembly for magnetic tape which comprises a metal roll axis having provided therearound an elastic roll which further has provided endplates around the metal roll axis at two positions which are longer, by at least the thermal expansion point of the elastic roll, than the length of the elastic roll in the direction of the axis thereof, the elastic roll comprising the polyamide resin as indicated above.

BRIEF DESCRIPTION OF THE DRAWINGS

FIG. 4 (b) shows a cross-sectional view in the rotation direction of the roll of FIG. 4 (a) after use in super calendering which is expanded in the shape of a drum.

FIGS. 6 through 10 each show a cross-sectional view in the rotation direction of various super calendering rolls for magnetic tapes in accordance with other embodiments of the present invention.

In FIGS. 4 through 10 numeral 1 designates an elastic roll, numeral 2 designates a metal roll axis, numeral 3 designates the expanded areas of the elastic roll, numeral 4 designates endplates, numeral 5 designates a fixed washer, L designates the length of the elastic roll, and $l_o$ designates the distance (space) between the elastic roll and the endplates.

FIG. 11 is a graph showing the relationship between the pressure (kg/cm) between rolls and the envelope deviation (%).

FIG. 12 is a graph showing the relationship between the linear pressure (kg/cm) between rolls and the video sensitivity (dB).

DETAILED DESCRIPTION OF THE INVENTION

Figure 1:
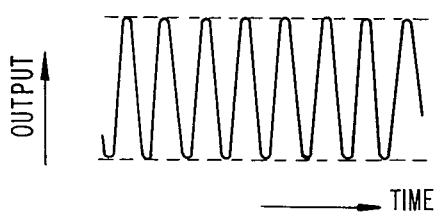
FIG. 1 and FIG. 2 show output wave shapes of magnetic tapes in order to explain envelope deviation, in which Vo represents the output deviation width of a carrier signal and Vs represents the ½ width of the output value of the carrier signal.
Figure 2:
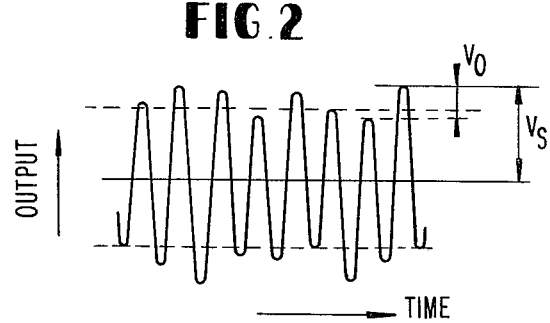

The term "polyamide resin" as is used in the present invention refers to a condensation polymer having acid amide bonds (—CONH—) in the main chain thereof. In more detail, the acid amide bond (a) may be separated by a divalent group as illustrated by the formulae and typical examples below; (b) may have one additional —CO— group on the nitrogen atom of the amide bond (i.e., imide bond

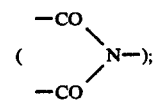

a polymer containing the same is sometimes referred to as a "polyimide resin" herein); and (c) may also be present with an imide bond (i.e., a polymer containing amide and imide bonds, which is sometimes referred to as a "∓polyamideimide resin" herein). Representative examples of methods for producing useful polyamide resins are shown below:

(1) Condensation of Diamines and Dicarboxylic Acids

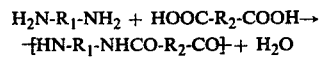

(2) Condensation of Amino Acids

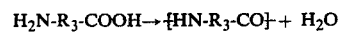

(3) Ring-Open Reaction of Lactams

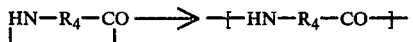

In reactions (1) to (3) above, $R_1$, $R_2$ and $R_4$ each represents either nothing, i.e., a direct bond between the moieties separated thereby, or a divalent group having 1 to 20 carbon atoms; and $R_3$ represents a divalent group having 1 to 10 carbon atoms.

Preferred examples of $R_1$ are a divalent group free of substituents directly connected between the two nitrogen atoms; an alkylene or alkenylene group having 1 to 20 carbon atoms, cyclohexanediyl, phenylene, tolylene, xylylene, naphthylene, biphenylene, etc.

Preferred examples of $R_2$ are a divalent group free of substituents directly connected between the two carbon atoms; an alkylene or alkenylene group having 1 to 20 carbon atoms, cyclohexanediyl, phenylene, tolylene, xylylene, naphthylene, biphenylene, etc.

Preferred examples of $R_3$ are an alkylene group having 1 to 10 carbon atoms, a carboxyl-substituted alkylene group having 1 to 10 carbon atoms, a phenyl-substituted alkylene group having 1 to 10 carbon atoms, etc.

Preferred examples of $R_4$ are a divalent group free of substituents and directly connected between the nitrogen atom and the carbon atom and an alkylene group having 1 to 20 carbon atoms.

Dicarboxylic acids as employed in reaction (1) may be in the form of the anhydrides or esters thereof. Amino acids as employed in reaction (2) may also be in the form of the anhydrides thereof.

Specific examples of diamines employed in reaction (1) include hydrazine, methylene diamine, dimethylene diamine, trimethylene diamine, tetramethylene diamine, pentamethylene diamine, hexamethylene diamine, heptamethylene diamine, octamethylene diamine, nonamethylene diamine, decamethylene diamine, piperazine, diaminocyclohexane, di(aminomethyl)cyclohexane, bis(4-aminocyclohexyl)methane, bis(4-amino-1,2-dimethylcyclohexyl)methane, o-phenylenediamine, m-phenylenediamine, p-phenylenediamine, 4,4'-diaminobiphenyl, tolylenediamine, xylylenediamine, naphthylenediamine, etc. Specific examples of dicarboxylic acids include oxalic acid, malonic acid, succinic acid, glutaric acid, adipic acid, pimelic acid, cork acid, azelaic acid, sebacic acid, nonanedicarboxylic acid, decanedicarboxylic acid, undecanedicarboxylic acid, dodecanedicarboxylic acid, hexadecanedicarboxylic acid, tapsinic acid, Japan acid, maleic acid, fumaric acid, citraconic acid, diglycolic acid, malic acid, citric acid, phthalic acid, isophthalic acid, terephthalic acid, maleic anhydride, phthalic anhydride, etc.

Specific examples of amino acids (aminocarboxylic acids) employed in reaction (2) include α-aminoacetic acid, L-α-aminopropionic acid, L-α-aminoisovaleric acid, ε-aminocaproic acid, L-α-aminoisocaproic acid, L-α-amino-β-phenylpropionic acid, L-aminosuccinic acid (aspargic acid), L-α-aminoglutaric acid (glutamic acid), γ-aminobutyric acid, α-amino-n-adipic acid, 11-aminoundecanoic acid, α-amino-DL-isoamylacetic acid, α-amino-n-butyric acid, α-amino-2-methylbutyric acid, α-aminocapric acid, α-aminocaproic acid, 1-aminocyclohexanecarboxylic acid, α-aminocyclohexylacetic acid, 1-amino-α-methylcyclohexanecarboxylic acid, aminomalonic acid ethyl ester, β-benzyl-L-aspartate, β-benzyl-DL-asparate, γ-benzyl-DL-glutamate, etc.

Specific examples of lactams employed in reaction (3) include isocyanic acid, glycine anhydride, α-pyrrolidone, α-piperidone, γ-butyrolactam, δ-valerolactam, ε-caprolactam, α-methylcaprolactam, β-methylcaprolactam, γ-methylcaprolactam, δ-methylcaprolactam, β,γ-dimethylcaprolactam, γ-ethylcaprolactam, γ-isopropylcaprolactam, ε-isopropylcaprolactam, γ-butylcaprolactam, ε-enantolactam, ω-enantolactam, η-caprylactam, ω-caprylactam, ω-laurolactam, etc.

These polyamides are usually termed nylons. Specific examples of nylons are nylon-1 obtained by the polymerization of isocyanic acid, nylon-2 obtained by the polymerization of N-carboxyamino acid anhydride, nylon-3 obtained by the polymerization of β-aminopivalic acid, nylon-4 obtained by the ring-open polymerization of α-pyrrolidone, nylon-5 obtained by the ring-opening polymerization of α-piperidone, nylon-6 obtained by the ring-opening polymerization of ε-caprolactam, nylon-7 obtained by the polymerization of ω-aminoenantoic acid, nylon-8 obtained by the ring open polymerization of caprylactam, nylon-9 obtained by the polymerization of ω-aminononyl acid, nylon-10 obtained by the ring-open polymerization of caprylolactam, nylon-11 obtained from 11-aminoundecanoic acid, nylon-12 obtained by the ring-opening polymerization of ω-laurolactam, nylon-66 obtained by the condensation polymerization of hexamethylene diamine and adipic acid, nylon-610 obtained by the condensation polymerization of hexamethylene diamine and sebacic acid, etc. Copolymers of these nylons, for example, nylon-6/66/610 (copolymerization ratio: 10/40/50), can also be employed.

In addition, copolymers of these nylons with the other monomers can also be employed. Specific examples include graft copolymers with vinyl monomers such as 2-methyl-5-vinylpyridine, styrene, methyl methacrylate, sodium acrylate, vinyl acetate, vinylidene chloride, acrylonitrile, etc.; copolymers with ring-open polymerizable monomers such as ethylene oxide, propylene oxide, ethylene imine, cycloxabutane, ethylene sulfide, epichlorohydrin, maleic anhydride, phthalic anhydride, hexahydrophthalic anhydride, dichloromaleic anhydride, dodecyl succinic anhydride, etc.

These copolymers can be obtained by conventional methods, for example, graft polymerization, acylation, alkylation, etc.

Monomer casting nylons (MC nylons) which are obtained by the rapid ring-open polymerization of lactams in the presence of a catalyst and then molding the polymer can also be employed in the present invention. Reference should be made to the Chemical Engineering News and Modern Plastics citations later given. MC nylons are generally prepared by casting nylon monomers, e.g., E-caprolactam melted at 100° C. in the absence of water, to which a small amount of an alkali catalyst has been added, into a mold previously heated to a temperature between 100° C. and the melting point of the monomer, and subjecting the monomer to polymerization for a definite period of time.

The polyamide resins employed in the present invention can be in the form of crystals which are rendered dense, fine and uniform by adding thereto crystallizing agents. Examples of preferred crystallizing agents are phosphorus compounds such as $Pb_3(PO_4)_2$, $NaHPO_4$, $Na_7P_5O_{16}$, etc.; fine particles of ores such as corundum, rutile, kaolin, asbestoes, graphite, $MoS_2$, $WS_2$, $SiO_2$, tacl, etc.; powdered polymers such as polyethylene terephthalate, polyethylene naphthalate, etc.

The polyamide resins may also be reinforced with glass. FRTP (fiber glass reinforced thermoplastic) resins which are obtained by kneading glass fibers into polyamide resins, dispersing glass fibers into pellets of polyamide resins, filling with glass beads, etc., can also be employed.

Of these polyamide resins, MC nylons are particularly preferred. Abrasives (e.g., $MoS_2$, $WS_2$, etc.) can be incorporated into the MC nylons during polymerization, if desired.

The molecular weight of these polyamide resins is generally from about 10,000 to about 1,000,000, preferably about 50,000 to about 600,000. A preferred polymerization degree is about 150 to about 3,000. Both molecular weight and polymerization degree are not overly critical.

Examples of MC nylons which are commercially available are nylon-6 such as Amylan CM 1031 (trade name, Toray Industries, Ltd.), Ube Nylon EA 1030 (trade name, Ube Industries, Ltd.), Glyron A 1050 (trade name, Unitika, Ltd.), Plaskon 8211, 8229 (trade name, Allied Chemical Corp.), Spencer Nylon 607 (trade name, Spencer Chemical Co., Ltd.), Foster Nylon BK40F and BK40T (trade names, Foster Grant Co., Ltd.), Ultramid BKR 1144/3 (trade name, BASF A. G.), Durethan BK50F and BK64F (trade names, Bayer A. G.), Maranyl F160 and F170 (trade names, ICI, Ltd.), etc.; nylon-66 such as Amylan CM 3021 (trade name, Toray Industries, Ltd.), Zytel 42 (trade name, E. I. du Pont de Nemours & Co.), Ultramid AKR 1183 (trade name, BASF A. G.), Maranyl A150M and A100E (trade names, ICI, Ltd.), Nylatron GS (trade name, Polymer Corp.), etc.; nylon-610 such as Amylan CM2006 (trade name, Toray Industries, Ltd.), Zytel 38 (trade name, E. I. du Pont de Nemours & co.), Ultramid S4 and S4K (trade names, BASF A. G.), Maranyl B100 and B100C (trade names, ICI, Ltd.), etc.; FRTP nylon-6 such as Amylan CM1003G (trade name, Toray Industries, Ltd.), UBE Nylon IB1013G (trade name, Ube Industries, Ltd.), Glyron A1030GF (trade name, Unitika, Ltd.), Plaskon 8230 (trade name, Allied Chemical Corp.), Durethan BKV30H (trade name, Bayer A. G.), Ultramid B3G (trade name, BASF A. G.), etc.; FRTP nylon-66 such as Amylan CM3003G (trade name, Toray Industries, Ltd.), Zytel 7110-33 (trade name, E. I. du Pont de Nemours & Co.), Nylatron GS-51 (trade name, Polymer Corp.), Maranyl A190 (trade name, ICI, Ltd.), Ultramid A3G (trade name, BASF A. G.), etc.; FRTP nylon-12 such as Amylan XF 5000 and XF 5000F (trade names, Toray Industires, Ltd.), etc.; MC nylons such as MC 901, MC 904 and Nyratron GSM (MC 801) (trade names, Polymer Corp., and Mitsubishi Plastic Industires, Ltd.), Monomaron 21100, 21115, 21200, 21215, 21300 and 21315 (trade names, Starlight Industry Co., Ltd.), etc. MC nylons are described in detail in *Chemical Engineering News*, 39 (33), 58 (1961) and *Modern Plastics*, 45 (8), 173 (1968); all of the MC nylons described therein may be used with success in the present invention.

Useful polyamides are also described in detail in Osamu Fukumoto, Plastic Zairyo Koza (Plastic Materials Series) (16), *Polyamide Jushi (Polyamide Resin)*, published July 25, 1970, Nikkan Kogyo Shinbun (Industrial Daily News, Ltd.), Tokyo; Murahashi, Imoto, and Tani, *Gosei Kobunshi V (Synthetic High Molecular Weight Substance V)*, pages 11-186, published June 15, 1971, Asakura Shoten, Tokyo; and in U.S. Pat. Nos. 2,130,497, 2,130,523, 2,149,273, 2,158,064, 2,223,493, 2,249,627, 2,534,347, 2,540,352, 2,715,620, 2,756,221, 2,939,862, 2,994,693, 3,012,994, 3,133,956, 3,188,228, 3,193,475, 3,193,483, 3,197,443, 3,226,362, 3,242,134, 3,247,167, 3,299,009, 3,328,352, and 3,354,123, etc.

Polyimide resins and polyamideimide resins which are synthesized in a manner similar to the polyamide resins as described above can also be used.

The polyimide resins are obtained by a self-condensation polymerization of acid anhydrides or esters thereof (4-aminophthalic anhydride, dimethyl-4-diaminophthalate, etc.); by a condensation polymerization of acid anhydrides with diamines; or by the reaction of acid anhydrides with diamines in an organic solvent with subsequent intramolecular dehydrative cyclization of the resulting soluble polyamide acids.

The polyamideimide resins are obtained by the reaction of low molecular weight polyamides having amino groups at the terminals thereof with acid anhydrides; by the reaction of low molecular weight polyamide acids having amino groups at the terminals thereof and dibasic chlorides; by the reaction of trimellitic acid derivatives with diamines, etc.

Specific examples of acid anhydrides or esters thereof include pyromellitic anhydride, pyromellitic acid-1,4-dimethyl ester, pyromellitic acid tetramethyl ester, pyromellitic acid ethyl ester, 2,3,6,7-naphthalene tetracarboxylic dianhydride, 3,3',4,4'-biphenyl tetracarboxylic dianhydride, 1,2,5,6-naphthalene tetracarboxylic dianhydride, 2,2',3,3'-biphenyl-tetracarboxylic dianhydride, 2,2',6,6'-biphenyl tetracarboxylic dianhydride, etc. Specific examples of diamines are those aromatic diamines as described hereinbefore.

Specific examples of solvents which are used in the preparation of polyamide resins include dimethylformamide, dimethylacetamide, dimethylmethoxyacetamide, N-methylcaprolactam, dimethylsulfone, tetramethylene sulfone, N-acetyl-2-pyrrolidone, etc.

Details on useful polyimide resins are described in M. T. Bogert et al., *Journal of American Chemical Society*, 30, page 1140 (1908), and in U.S. Pat. Nos. 2,170,853, 2,867,609, 2,880,230, 3,073,785, 3,179,614, 3,179,630, 3,179,633, 3,179,634, etc.

Details on useful polyimideamide resins are also described in G. M. Bower et al., *Journal of Polymer Science*, A-1, page 3135 (1903), and in U.S. Pat. No. 2,421,024, British Pat. No. 570,858, French Pat. No. 386,617, Belgian Pat. No. 650,979, etc.

The surface hardness of the elastic rolls in accordance with the present invention is at least about 70 in Shore hardness D (JIS K-6301), preferably from about 70 to about 100, more preferably 80 to 95. The compressive strength (ASTM, D-695) of the elastic rolls is above about 600 $kg/cm^2$, preferably above 700 $kg/cm^2$.

The linear expansion coefficient is at least about $8 \times 10^{-5}/°$ C., preferably about $8 \times 10^{-5}$ to about $8 \times 10^{-4}/°$ C. It has been found that at these conditions good super calendering effects are obtained.

When the Shore hardness is less than about 70 and the compressive strength is less than about 600 $kg/cm^2$, good surface properties are not achieved. When the Shore hardness exceeds about 100, the roll tends to be brittle and loses its elasticity. If such a roll is used for super calendering, it cracks and thus cannot be used.

Figure 4A:
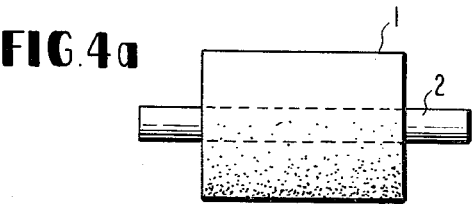
FIG. 4 (a) shows the state before the use of a conventional super calendering roll.
Figure 4B:
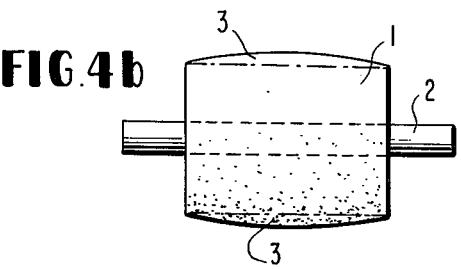

Further, when the linear expansion coefficient is less than about $8 \times 10^{-5}/°$ C., a change in shape which prohibits expansion of the elastic roll in the direction of the axis thereof (see FIG. 4 (b)) does not occur; on the other hand, when the linear expansion coefficient exceeds about $8 \times 10^{-4}/°$ C., the elastic roll is overly soft and, as a result, good super calendering effects are not obtained. The requirement of this specific linear expansion coefficient range must be met when one wishes to operate the super calendering roll assembly continuously.

The polyamide, polyimide, polyamideimide, or mixtures thereof may contain a small amount of water to further improve the properties of the elastic roll. When water is present in the elastic roll, electric charging due to friction is decreased, which serves to smooth the super calendering operation. The preferred range of the water content is up to about 10% by weight based on the resin weight. When MC nylons are used for the elastic roll, the water content can be up to about 7% by weight. When the water content is less than about 0.5% by weight, no substantial difference in friction charge-preventing effect is observed. A preferred water content is about 0.5 to about 2% by weight. The water can be added during the molding of the resin(s) into the elastic roll.

When an antistatic agent, e.g., carbon black, molybdenum disulfide, surface active agents, etc., are present in the elastic roll, however, the water content as described above is not limitative. It has been confirmed that it is preferred to use carbon black or molybdenum disulfide in an amount of about 3 wt% or more, and surface active agents in an amount of about 1 wt% or more based on the resin weight.

The pressure between the metal roll and elastic roll upon super calendering is generally about 250 to about 1,000 kg/cm²; the treatment temperature is generally about 30 to about 200° C., preferably 40° to 150° C.

When the pressure between the rolls is less than about 250 kg/cm², no substantial super calendering effect is exhibited. When the pressure is greater than about 1,000 kg/cm², the roll might damage magnetic recording elements. When the treatment temperature is less than about 30° C., no substantial super calendering effect is exhibited. If the temperature is above about 200° C., changes in shape due to softening of the magnetic layer occur, which are not desired.

In addition, with the elastic rolls made of the polyamide, polyimide or polyamideimide (hereafter generally referred to a polyamide resin unless otherwise indicated) resins, if there are joints, wrinkles, etc., on the surface thereof, these tend to cause uneven pressure; it has been found that it is preferred to use elastic rolls prepared by a casting method as described in the earlier provided *Chemical Engineering News* and *Modern Plastics* citations in order to solve such problems, whereby the elastic rolls exhibit excellent compressive strength. It has also found that, in particular, good effects are obtained using these polyamide resins; MC nylons selected from nylon-6, nylon-66, and nylon-610.

As materials for the metal roll axis and endplates which are used in the present invention, metals are employed which are used in conventional super calendering rolls. The material selected from the metal roll axis is not overly important, and the present invention is not limited to any specific materials of construction. One skilled in the art will easily be able to appreciate the properties which useful metals must illustrate. For instance, typical examples of such metals are cast iron (carbon content: 2 to 4%), carbon steel, 5–7% Ni-cast iron, 14–17% Si-cast iron, stainless steel, cast stainless steel, heat resistant steel, heat resistant cast steel, 13% Cr-ferrite steel, 14–25% Ni-austenitic cast steel, 18 Cr-8 Ni-austenitic steel, duralumin, etc.; in which all percents are by weight. These materials may be subjected to hard chromium plating, if desired or necessary, in a conventional manner.

Figure 5:
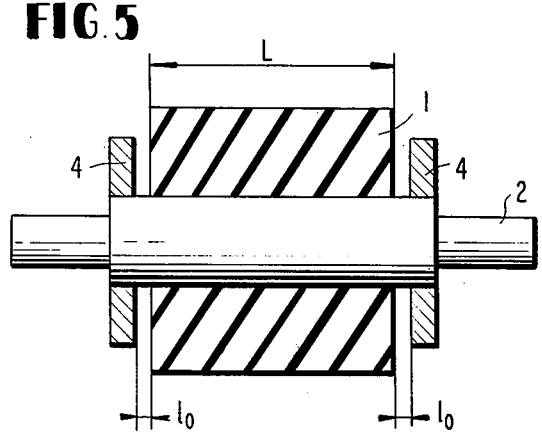
FIG. 5 shows a super calendering roll assembly for magnetic tapes in accordance with the present invention.

For continuous operation, an elastic roll at least the surface of which is composed of a polyamide resin as described above is preferably used in a structure as shown in FIG. 5, i.e., the elastic roll comprises a metal roll axis 2 having provided therearound an elastic roll part 1 and donut-shaped disc endplates 4 provided around the metal roll axis 2 which are arranged at positions so as to keep a distance ($l_o$) as shown in FIG. 5. In more detail, the distance ($l_o$) between the endplates 4 and the elastic roll part 1 is equal to the thermal expansion point of the elastic roll part 1 under operational conditions of the super calendering roll assembly of this invention. Accordingly, the position where each of the endplates is set is, of course, longer than the length (L) of the elastic roll part 2. All of the cross sections of the rolls 1 and 2 and the endplates 4 at a right angle to the axis direction are circular.

Figure 7:
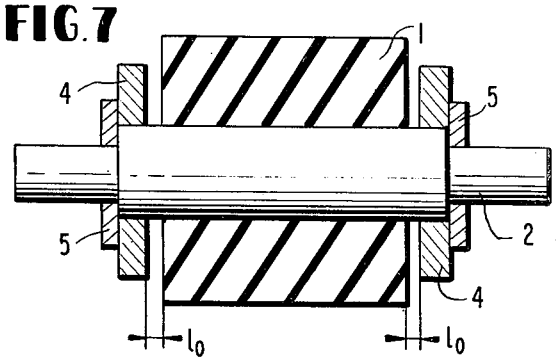
Figure 6:
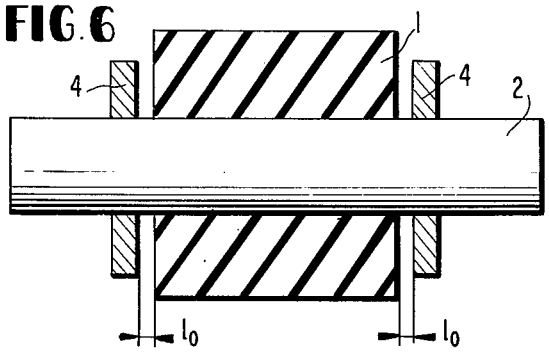
Figure 8:
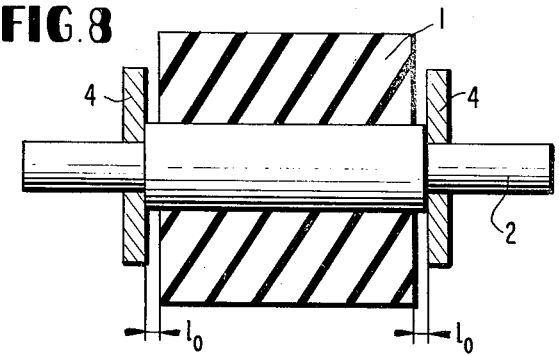

As is shown in FIG. 6, the outer diameter of the metal roll axis 2 can be rendered uniform as a whole. Further, a fixed washer 5 can be provided as is shown in FIG. 7 and the shape of the endplates 4 can be modified as shown in FIG. 8 and FIG. 9.

FIGS. 5 through 10 show the state of the roll assembly before super calendering is performed. When the roll assembly is employed in a super calendering treatment, the elastic roll part is thermally expanded in the axis direction due to autogenous heat generated during operation. The thermal expansion of the elastic roll part 1 is eliminated by the area between the elastic roll part 1 and the endplates 4 which is designed so as to equal the distance corresponding to the thermal expansion of the elastic roll part 1. In more detail, this can be accomplished by setting the distance ($l_o$) to compensate for the thermal expansion in the radial direction plus the thermal expansion in the axial direction or, as later explained, by making the endplates 4 movable. It should be noted that with many prior art rolls, for example, cotton rolls, spaces exist between the fibers which comprise the roll and thus, to a certain extent, expansion due to autogenous heat is partially compensated for by the spaces between the fibers. With the nylon rolls of the present invention, there is no space between fibers as in a cotton roll, and thus the expansion point will generally be somewhat larger. However, by providing endplates at a distance ($l_o$) or by providing movable endplates, expansion due to autogenous heat is compensated for and an uneven roll surface does not develop whereby the generation of heat due to changes in shape is avoided.

In addition, as is shown in FIG. 10, endplates 4 can be designed so as to move in the direction of the axis of the metal roll axis 2 ($\rightleftarrows$) so that the endplates 4 can be freely moved by the thermal expansion of the elastic roll 1. Such a structure is convenient since the endplates move in response to changes in shape, thereby compensating for thermal expansion of the elastic roll in the direction of the axis thereof.

Super calendering rolls for magnetic tapes in accordance with the present invention can be prepared as follows.

The inner diameter d of the elastic roll part 1 is smaller by a size equal to the difference corresponding to the thermal expansion point of the elastic roll part 1 than the outer diameter d' of the metal roll axis 2. The elastic roll part 1 which is molded into the required size is heated to a temperature above the softening point of the resin (the super calendering temperature is, of course, far lower than the softening point of the resins) and placed around the metal roll axis 2 while heated. The heating temperature is preferred to be at about 80° to about 100° C. Thereafter, the endplates 4 are put around the metal roll axis 2 while heated (to about 200 to about 300° C.) and then fixed by any conventional means, e.g., a hammer, a screw or the like. The thickness of the donut-shaped endplates is preferred to be about 50 to about 100 mm.

For the endplates 4 to be a movable structure as shown in FIG. 10, it is required that the inner diameter of the endplates be larger than the outer diameter of the metal roll axis. The difference between the inner diameter and the outer diameter is sufficient if it is such a difference that the endplates can be moved by the load placed thereon by the thermal expansion of the elastic roll.

The distance ($l_o$) between the elastic roll part 1 and the endplates should be a distance which corresponds to the thermally expanded size at a temperature of about 150° C. which is the temperature due to the autogenous heat caused by friction upon the super calendering treatment of a magnetic tape. The length of the elastic roll which is used for super calendering treatment is about 20 to about 250 cm. In this case, the distance ($l_o$) is generally about 0.6 to about 25 mm. For instance, the distance ($l_o$) is about 3 to about 10 mm when using an elastic roll 100 cm long.

Considering the thermal expansion point, cracking, super calendering effect and the loss of polishing finish in the case of the formation of scratches on the elastic roll, the thickness of the elastic roll part provided around the metal roll axis is preferred to be about 20 to about 150 mm, more preferably 30 to 100 mm. However, the thickness is more adequately determined depending upon the length (L) of the elastic roll part.

Figure 3:
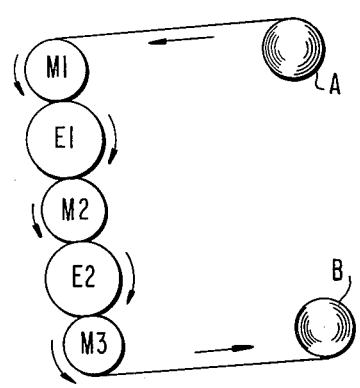
FIG. 3 shows an example of the method for super calendering in accordance with the present invention in which A is a guide roll, B is a winding roll, $M_1$, $M_2$ and $M_3$ each is a metal roll, and $E_1$ and $E_2$ each is an elastic roll.

The elastic roll in accordance with the present invention is set in an assembly as shown in FIG. 3. The number of elastic rolls and metal rolls is optional, i.e., it can be either decreased or increased depending upon degree of super calendering required.

The effects and advantages of the present invention will be shown below:

(1) Color noise can be decreased, i.e., envelope deviation can be decreased.

(2) Video sensitivity can be increased.

(3) Roll durability upon continuous use is superior to that of rolls made of conventional rubbers or fibers.

(4) Super calendering can be carried out at high pressure between rolls.

(5) Super calendering effects are excellent because there is substantially no uneven hardness within the roll.

(6) No friction occurs due to abrasion of the surfaces of the rolls.

(7) Roughness of the surface of the magnetic layer can be lessened.

(8) Surface electrical resistance of the roll can be decreased by the presence of moisture, and thus electrical charging can be prevented.

(9) A roll which is readily available for use can be provided by mechanical abrasion or polishing.

(10) The roll is not deteriorated by swelling due to moisture absorption during storage thereof.

(11) The roll is excellent in resistance to solvents as compared with rubber materials so that it is easily cleaned.

(12) When envelope deviation is maintained at the same level, the number of the rolls for super calendering can be decreased compared to conventional rolls.

(13) The roll can be subjected to antistatic treatment by incorporating lubricants such as carbon black, graphite, carbon black graft polymers, tungsten disulfide, surface active agents, etc.

In addition, an elastic roll having a preferred structure further provides the improvements summarized below:

(14) The thermal expansion point due to the autogenous heat in the elastic roll part and due to heating of the metal roll generated during super calendering becomes small and the expanded parts are eliminated in the direction of the axis thereof. Accordingly, the drum-shaped expansion which usually appears at the outer circumference of conventional rolls is not encountered so that the pressure placed on the elastic roll becomes uniform and roughness on the surface of the tape is completely eliminated and problems such as accidental cutting of the tape does not occur.

(15) Problems such as skewing of the roll or cracking of the roll do not occur so that the life of the roll is extended approximately 3 to 5 times.

(16) The durability of the roll per se against heat is improved. Thus, nip pressures of 500 kg/cm can be used (with conventional rolls, at best one can use nip pressures of less than 300 kg/cm whereas super calendering generally requires about 30 to about 500 kg/cm); and when certain resins are employed, high nip pressures of 600 to 700 kg/cm or more can be applied. As a result, the degree of packing (the amount of magnetic materials coated on the tape without any difficulty) and the surface properties of the magnetic tape are improved. An improvement in color noise and the S/N ratio and a decrease in the envelope deviation are remarkably observed in precision tapes, video tapes and small video tapes.

(17) Continuous operations at high nip pressures enable one to increase the operational efficiency of super calendering.

Ferromagnetic powders which can be employed in magnetic tapes may be those conventionally employed in the art, which are, for instance, described in U.S. Pat. No. 3,473,960 and Japanese Patent Publications 28368/64 and 23625/65.

Examples of magnetic coating composition are described in, e.g., U.S. Pat. Nos. 3,242,005, 3,389,014, 3,597,273, 3,687,725 and 3,713,817.

The present invention will now be illustrated in detail with reference to several examples. It will be easily understood to one skilled in the art that compositions, proportions, operational sequences, etc., can be modified within the spirit of the present invention. Accordingly, the present invention should not be limited by the examples below.

Unless otherwise indicated, all parts are by weight and the following conditions were used in the examples.

(1) Super calendering assembly as shown in FIG. 3, where:

|  | Outer Diameter | Length | Material |
|---|---|---|---|
|  | (mm) | (mm) |  |
| $M_1$ | 250 | 960 | cast iron |
| $M_2$ | 200 | 960 | cast iron |
| $M_3$ | 300 | 960 | cast iron |
| $E_1$ and $E_2$ | 300 | 600 |  |

(2) Elastic roll:

|  | Outer Diameter | Inner Diameter | Length | Thickness |
|---|---|---|---|---|
|  | (mm) | (mm) | (mm) | (mm) |
| Metal roll axis | 200 | — | 960 | — |
| Elastic roll part | 300 | 197 | 600 | 50 |

(3) Attachment conditions for elastic roll parts: After heating the elastic roll part to 100° C., it is placed around the metal roll axis previously cooled to 0° C.

(4) Endplates as shown in FIG. 7:

| Composition | cast iron |
|---|---|
| Outer diameter (mm) | 290 |
| Inner diameter (mm) | 200 |
| Thickness (mm) | 40 |

(5) Attachment conditions for endplates: After heating the endplate to 100° C., it is placed around the metal axis previously cooled to 0° C. Alternatively, it is fixed around the metal axis with screws of a pitch of M100, JIS-B-0207 (1968).

(6) Conditions for super calendering:

| Pressure | 400 kg/cm (linear pressure) |
|---|---|
| Temperature | 50° C |
| Speed | 40 m/min |

EXAMPLE 1

| Preparation of Magnetic Tape | parts |
|---|---|
| Maghemite ($\gamma$-$Fe_2O_3$) (acicular ratio: 7/1; particle length: 0.8 $\mu$; Hc: 330 Oe) | 300 |
| Vinyl chloride-vinyl acetate copolymer (copolymerization ratio: 87:13 wt%; molecular weight: ca. 400) | 40 |
| Epoxy resin (reaction product of bisphenol A and epichlorohydrin; OH-content: 0.16; molecular weight: ca. 470; epoxy content: 0.36 - 0.44; specific gravity: 1.1181 at 20° C) | 30 |
| Silicon oil (dimethylpolysiloxane: polymerization degree: ca. 60) | 5 |
| Toluene sulfonic acid ethyl amide | 7 |
| Ethyl acetate | 250 |
| Methyl ethyl ketone | 250 |

The composition indicated above was charged to a ball mill and ball milled to disperse. To the dispersion there were added 20 parts of a polyisocyanate compound (Desmodur L-75; trade name, made by Bayer A.G., 75 wt% ethyl acetate solution of the adduct of 3 mols of tolylene diisocyanate and 1 mol of trimethylpropane). The mixture was uniformly mixed and dispersed to make a magnetic coating liquid.

The magnetic coating liquid was coated onto a polyethylene terephthalate film having a thickness of 20 microns to a dry thickness of 7 microns. The film was then oriented in a direct current magnetic field of 1,000 Oe. The film thus oriented was heated at 80° C. for 10 hours in order to accelerate hardening of the binder to obtain a wide magnetic tape.

The thus obtained magnetic tape was subjected to super calendering treatment using elastic rolls made of various materials as indicated in Table 1. The super calendering roll assembly used was as shown in FIG. 3, in which the metal rolls $M_1$, $M_2$ and $M_3$ each were made of hard chromium plated iron. The results are also shown in Table 1 below.

TABLE 1

| Sample No. | Material of Elastic Roll | Shore Hardness | Linear Pressure[10] (Note 1) | Video Sensitivity (Note 2) | Envelope Deviation | Surface Roughness (Note 3) |
|---|---|---|---|---|---|---|
|  |  | (D) | (kg/cm) | (dB) | (%) | ($\mu$m) |
| 1 | Cotton (long fiber[4] crude cotton) | 73 | 400 | ±0 | 17 | 0.17 |
| 2 | Filmat[5] (short fiber cotton) | 75 | 400 | −0.5 | 19 | 0.185 |
| 3 | Woolen Paper[6] (short fibers of cotton and wool pulp) | 74 | 400 | −0.3 | 18 | 0.18 |
| 4 | Urethane Rubber[7] | 75 | 375 | ±0 | 15 | 0.15 |
| 5 | Neoprene Rubber[8] | 75 | 375 | ±0 | 16 | 0.16 |
| 6 | Nylon-6[9] | 80 | 375 | +1.5 | 10 | 0.05 |

[1]Linear pressure is the amount of applied pressure divided by the contact area of the roll, i.e., the pressure is divided by the length (525 cm) of the roll.
[2]After each sample was slit to a ¾ inch (ca. 19 mm) width, it was placed in a video cassette U-matic (trade name, made by Sony Corp.). Using a video cassette recorder (CR-600 B Model, made by Nippon Victor Co., Ltd.), a single signal of 5 MHz was recorded and then the reproduced signal measured. The difference in video sensitivity between the running direction of the magnetic tape and the width direction at a right angle thereto was designated "video sensitivity". The video sensitivity of Sample 1 (±0 dB) was made the control for video sensitivity.
[3]Surface roughness was measured using a surface roughness meter, manufactured by Tokyo Seimitsu Co., Ltd., which is an assembly consisting of Pick-up ERM-D 100A, Amplifier EMD-F10A and Chart Recorder E-RC-CF.
[4]Prepared by compression molding long cotton fibers (20 to 50 mm in length and 12 to 25 $\mu$ in diameter) which were previously formed into a sheet by pressing.
[5]Prepared by compression molding short absorbant cotton fibers which were previously formed into a sheet form by pressing.
[6]Paper-like sheet made of wool.
[7]Specific gravity: 1.24 - 1.26 at 23° C. Reaction product of ethylene diamine + polyester isocyanate prepared by the reaction of a polyester (from butanediol and adipic acid) and diphenyl-4,4'-diisocyanate; molecular weight: ca. 200,000.
[8]Polychloroprene; molecular weight: ca. 200,000; Specific gravity: 1.24 - 1.26 at 23° C.
[9]Homopolymer of $\epsilon$-caprolactam; molecular weight: ca. 900; specific gravity: 1.24 - 1.26 at 23° C.
[10]Measured in accordance with Astm D696-44

As can be seen from the results in Table 1 above, the rolls made of conventional materials (Samples 1 to 5) do not provide an envelope deviation of less than 15% and also give inferior surface roughness and video sensitivity as compared to those obtained with the nylon roll of the present invention (Sample 6).

EXAMPLE 2

Using a wide magnetic tape obtained as in Example 1, super calendering was performed with elastic rolls made of various materials. The particulars of the elastic rolls and the Shore hardness thereof were the same as those indicated in Table 1. Other conditions for the super calendering were identical with Example 1. The durability of the rolls and the envelope deviation of the magnetic tapes after super calendering were measured. The results are shown in Table 2 below.

TABLE 2

| Sample No. | Material of Elastic Roll | Operation Time (hours) | Envelope* Deviation (%) | Durability |
|---|---|---|---|---|
| 7 | Cotton | 600 | 15 | Impossible to use due to skewing |
| 8 | Filmat | 600 | 17 | Impossible to use due to skewing |
| 9 | Woolen Paper | 600 | 16 | Impossible to use due to skewing |
| 10 | Neoprene Rubber | 51 | 16 | Roll broke after 51 hours and impossible to use |
| 11 | Nylon-6 | 600 | 10 | No Damage |

*Slight difference from the values given at Table 1 are due to experimental error.

As can be seen from the results in Table 2, it is impossible to use a Neoprene rubber roll (Sample No. 10) for a long period of time. The rubber roll broke after only 51 hours of operation and was confirmed to be inferior in durability. With cellulose rolls (Sample Nos. 7-9), while a slight improvement in envelope deviation was observed as running time increased when compared with the data obtained in Example 1, the envelope deviation did not reach 10% which was the envelope deviation observed with the nylon roll (Sample No. 11) of the present invention. Further, in Sample No. 7, which had a relatively low envelope deviation, roll skewing, which implied damage to the inside of the roll, was caused and the roll could not be used after the test.

EXAMPLE 3

Using a wide magnetic tape obtained as in Example 1, super calendering was applied thereto with various elastic rolls and varying linear pressure (kg/cm) between rolls.

The relationships between linear pressure/envelope deviation and /video sensitivity are shown in FIG. 11 and FIG. 12, respectively. The material and the linear pressure on each sample are shown in Table 3 below.

TABLE 3

| Sample No. | Material of Elastic Roll | Shore Hardness (D) |
|---|---|---|
| 12 | Cotton$^{(1)}$ | 73 |
| 13 | Neoprene$^{(2)}$ Rubber | 75 |
| 14 | Nylon-66$^{(3)}$ | 70 |
| 15 | Nylon-6$^{(4)}$ | 75 |
| 16 | Nylon-6$^{(5)}$ | 80 |

TABLE 3–continued

| Sample No. | Material of Elastic Roll | Shore Hardness |
|---|---|---|
| 17 | MC Nylon$^{(6)}$ | 90 |

$^{(1)}$Same as that described in Table 1.
$^{(2)}$Same as Neoprene rubber identified in Table 1
$^{(3)}$Specific gravity: 1.14 – 1.15 at 23° C; Copolymer of hexamethylene diamine and adipic acid at a 1 : 1 molar ratio; molecular weight: ca. 800
$^{(4)}$Specific gravity: 1.12 – 1.15 at 23° C; Homopolymer of ε-caprolactam; molecular weight: ca. 700
$^{(5)}$Homopolymer of ε-caprolactam; molecular weight: ca. 900
$^{(6)}$MC-901, trade name made by Mitsubishi Plastic Industries, Ltd., which is prepared by monomer casting nylon-6; specific gravity: 1.15 – 1.17 at 23° C; molecular weight: ca. 1,200.

It can be seen from the results shown in FIGS. 11 and 12 on envelope deviation that if the pressure between rolls increases, envelope deviation in a conventional cotton roll (Sample 12) decreases at low values, but rather increases at a pressure greater than a certain level.

In a rubber roll (Sample 13), envelope deviation was about 15% at best.

Referring to video sensitivity, an increase in sensitivity is observed by increasing linear pressure as is shown in FIG. 12. However, with a rubber roll (Sample 13), no further improvement was observed when the pressure was over a certain level. A cotton roll (Sample 12) showed rather higher sensitivity at high pressure.

As opposed to these conventional rolls, when nylon rolls in accordance with the present invention were employed, excellent effects were observed, i.e., both a decrease in envelope deviation and an increase in video sensitivity. Extremely good values were obtained as compared with the conventional rolls.

As a result of further investigations, it was found that nylon rolls in accordance with the present invention are preferred to contain water therein. The water content is preferably about 0.5 wt% or more. The charge voltage of a roll changed as shown in Table 4 by varying the water content.

TABLE 4

| Water Content in Nylon Roll (wt%) | Electric Charge due to Friction (V) |
|---|---|
| less than 0.1 | 1,000 |
| 0.5 | 250 |
| 1.0 | 200 |
| 2.0 | 100 |

(Note 1) MC Nylon was used, which particulars are described in (Note 5) of Table 3.
(Note 2) Water content was measured in accordance with ASTM D570-42.

EXAMPLE 4

Preparation of Magnetic Tape

The magnetic tape was prepared as in Example 1.

Preparation of Super Calendering Elastic Roll

The evaluation of video sensitivity was made as in Example 1.

TABLE 5

| Sample No. | Material of Elastic Roll | Linear Expansion Coefficient of Elastic Roll | Distance $l_o$ | Conditions for Super Calendering | | Video Sesitivity |
|---|---|---|---|---|---|---|
| | | | | Linear Pressure | Temperature | |
| | | ($/°C$) | (mm) | (kg/cm) | (°C) | (dB) |
| 1-A | Nylon-6[1] | $8 \times 10^{-5}$ | — | 100 | 40 | 0.5 |
| 1-B | " | " | 2.0 | " | " | 0.5 |
| 2-A | " | " | — | 150 | " | 0.5 |
| 2-B | " | " | 2.5 | " | " | 0.5 |
| 3-A | " | " | — | 200 | " | 2.0 |
| 3-B | " | " | 2.6 | " | " | 0.5 |
| 4-A | " | " | — | 300 | " | 3.0 |
| 4-B | " | " | 3.0 | " | " | 0.5 |
| 5-A | Nylon-66[2] | $12 \times 10^{-5}$ | — | 200 | 50 | 3.1 |
| 5-B | " | " | 3.0 | " | " | 0.6 |
| 6-A | MC Nylon[3] | $9 \times 10^{-5}$ | — | 200 | 60 | 2.8 |
| 6-B | " | " | 3.5 | " | " | 0.6 |
| 7-B | Nylon-6[4] | $8 \times 10^{-5}$ | 3.0 | 200 | 50 | 0.5 |
| 8-B | " | " | 4.3 | " | 80 | 0.7 |
| 9-B | " | " | 5.5 | " | 100 | 0.8 |

(Note 1) Same as Nylon-6 identified in Table 3, Sample 16.
(Note 2) Same as Nylon-66 identified in Table 3.
(Note 3) Same as MC Nylon identified in Table 3.
(Note 4) Same as Nylon-6 identified in Table 3, Sample 16.

A roll axis composed of a carbon steel of 1,100 mm in length and 120 mm in outer diameter was used as the metal roll axis. Various elastic rolls of materials as in Table 5 (the particulars and the Shore hardness of which were the same as those for respective materials indicated hereinabove) were molded into a cylinder of 600 mm in length, 300 mm in outer diameter and 178.5 mm in inner diameter. After each of the elastic roll parts was elevated to 100° C., the elastic roll part was put around the metal roll axis. The thus obtained elastic rolls had no endplates. Duplicate rolls except for having endplates as follows were also prepared.

Donut-shaped endplates composed of carbon steel of 280 mm in outer diameter, 120 mm in inner diameter and 50 mm in thickness were inserted around each end of the metal roll axis obtained above while heating the endplates to 250° C. in a manner similar to the elastic roll described above in order to fix the whole system. Thus, the super calendering roll as shown in FIG. 6 was prepared. The thickness of the elastic part thus prepared was 60 mm.

Using two kinds of the super calendering rolls thus obtained, the magnetic tape obtained as described above was subjected to super calendering using the roll assembly as shown in FIG. 3 under the conditions indicated in Table 5, where the "A" Samples had no endplates and the "B" Samples had endplates as above indicated.

As can be seen from the results in Table 5, the super calendering rolls for magnetic tapes of the present invention (Sample Nos. 1-B through 6-B and 7 - 9) showed a slight but uniform difference in 5 MHz video sensitivity with an increase in both pressure and temperature on super calendering; on the other hand, the rolls having no endplates showed an increased difference in 5 MHz video sensitivity with an increase in pressure and temperature, which difference was not uniform. It can be appreciated from these results that super calendering effects are more satisfactory in accordance with elastic rolls having endplates, whereas the elastic rolls having no endplates provide uneven super calendering effects and the surface properties of the magnetic tapes worsen.

EXAMPLE 5

Super calendering rolls having a size as shown in Table 6 below were prepared as in Example 1 except that the thickness of the elastic roll (made of MC Nylon, MC-901 made by Mitsubishi Rayon Co., Ltd.) was modified and the endplates were not inserted under heating but fixed with screws by mounting male screws in the metal roll and female screws in the endplates.

TABLE 6

| Sample No. | Elastic Roll | | | | Metal Roll Axis | | Endplate | | | $l_o$ |
|---|---|---|---|---|---|---|---|---|---|---|
| | Length | Outer Diameter | Inner Diameter | Thickness after Preparation | Length | Diameter | Outer Diameter | Inner Diameter | Thickness | |
| | (mm) | (mm) | (mm) | (mm) | (mm) | (mm) | (mm) | (mm) | (mm) | (mm) |
| 10 | 600 | 300 | 98.5 | 100 | 1,100 | 100 | 280 | 100 | 60 | 0 |
| 11 | " | " | " | " | " | " | " | " | " | 5 |
| 12 | " | " | 178.5 | 60 | " | 180 | " | 180 | " | 0 |
| 13 | " | " | " | " | " | " | " | " | " | 5 |
| 14 | " | " | 258.5 | 20 | " | 260 | " | 260 | " | 0 |
| 15 | " | " | " | " | " | " | " | " | " | 5 |

Using the super calendering rolls (Nos. 10–15) shown in Table 6 above, super calendering of the same magnetic tape as in Example 1 was carried out using the roll assembly as shown in Table 3. The characteristics of each of the super calendering rolls are shown in Table 7 below.

TABLE 7

| Sample No. | 10 | 11 | 12 | 13 | 14 | 15 |
|---|---|---|---|---|---|---|
| Calendering Speed (m/min) | <20 | >20 | <100 | >100 | Broke in 20/min. and impossible to use | Broke in 20/min. and impossible to use |
| Maximum Value of Calendering Pressure (linear pressure: kg/cm) | 300 | 300 | 600 | 600 | 300 | 300 |
| Repair when Scratches Occurred | Possible to abrade and polish | Possible to abrade and polish | Possible to abrade and polish | Possible to abrade and polish | Cracked by abrasion | Cracked by abrasion |
| State Immediately after Super Calendering | Expansion to drum shape with heat generation | Heat generation $l_o = 0$ | Expansion to drum shape with heat generation | Heat generation $l_o = 0$ | Expansion to drum shape with heat generation | Heat generation $l_o = 0$ |

It can be seen from the results in Table 7 above that if there is no space ($l_o$) at the terminals of the elastic roll part, the elastic roll part is expanded into the shape of a drum since the thermally expanded point cannot be eliminated. In this case, the elastic roll could not be used.

When the thickness of the elastic roll part is greater than 100 m/m, running speed cannot be increased, and, hence, the super calendering pressure cannot be increased because if the speed is increased the thermal expansion becomes large. On the contrary, when the thickness is too thin, problems arise such as cracking occurs or the capability to be repaired upon scratching is lost.

It has thus been found that in view of the capability of use at high speed, resistance to pressure and re-abrasion capability, for commercial operation it is preferred, though the space ($l_o$) depends on the length of the roll, that when the roll is about 300 to about 1,500 m/m long, the space ($l_o$) be about 3 to about 10 mm and the thickness of the elastic roll part be about 30 to about 100 mm.

It has also been found, as a result of other experimentation, that when polyamide resins are employed for the elastic roll part, the space between the endplates and the elastic roll part is most preferably symmetrical at each end and is about 3 to about 10 m/m and the right and left endplates not be fixed but be free, and the thickness of the elastic roll part be about 30 to about 100 m/m, exact values being determined depending upon the length of the roll within the range set out above.

While the invention has been described in detail and with reference to specific embodiments thereof, it will be apparent to one skilled in the art that various changes and modifications can be made therein without departing from the spirit and scope thereof.

What is claimed is:

1. In a method for super calendering a magnetic recording element comprising a non-magnetic flexible support having provided thereon a magnetic layer mainly composed of ferromagnetic powders and a binder using a super calendering roll assembly having a metal roll in contact with the magnetic layer side and having an elastic roll on the support side opposite said metal roll which comprises pressing the surface of said magnetic layer to thereby super calender the same, the improvement wherein at least the surface area of said elastic roll comprises a polyamide resin having a Shore hardness D of 80 to 95, a linear expansion coefficient of at least $8 \times 10^{-5}/°$ C. a compressive strength of at least about 700, and a molecular weight of 10,000 to 1,000,000.

2. The method as claimed in claim 1, in which said polyamide resin has a linear expansion coefficient of about $8 \times 10^{-5}/°$ C. to about $8 \times 10^{-4}/°$ C.

3. The method as claimed in claim 1, in which said polyamide resin is selected from the group consisting of nylon-2, nylon-3, nylon-4, nylon-5, nylon-6, nylon-7, nylon-8, nylon-9, nylon-10, nylon-11, nylon-12, nylon-66, nylon-610 and a mixture thereof.

4. The method as claimed in claim 3, in which said nylon is prepared by a monomer casting method.

5. The method as claimed in claim 1, in which said polyamide resin contains water in an amount up to about 10% by weight of the resin.

6. The method as claimed in claim 1, in which the pressure between the metal roll and elastic roll during supercalendering is about 250 to about 1000 kg/cm² and the temperature is 30° to 200° C.

7. The method of claim 1 wherein said super calendered magnetic recording element has an envelope deviation less than 13%.

* * * * *